United States Patent Office 3,343,965
Patented Sept. 26, 1967

3,343,965
METHOD OF BAKING CAKE WITH TOPPING
Russell L. Gass, Hamilton, Ohio, assignor to The Procter & Gamble Company, Cincinnati, Ohio, a corporation of Ohio
No Drawing. Filed Apr. 30, 1965, Ser. No. 452,364
6 Claims. (Cl. 99—92)

ABSTRACT OF THE DISCLOSURE

Dry cake toppings comprising sugar, shortening and a water-binding agent (pregelatinized starch, carboxymethyl cellulose and sodium alginate) can be prepared and placed on a cake batter prior to baking. Fruit or nut pieces can be added. During baking the topping ingredients rise with and remain on top of the batter to produce a baked cake with a glaze-type topping.

This invention relates to cake toppings, including cake toppings which contain pieces of fruit and/or nuts. More specifically, it relates to cake toppings which are placed on cake batters prior to baking and baked simultaneously therewith, and to a method of preparing such cake toppings.

The terms "batter" and "dough" as hereinafter used are intended to conform to the basic distinction as recognized in the baking art. These two terms are mutually exclusive, a batter being defined as a mixture of flour, liquid and other ingredients which is thin enough to pour or drop from a spoon, and a dough being defined as a mixture of flour and other ingredients which is stiff enough to knead or roll. The cake toppings of this invention are intended for use on "batters" as defined above, particularly as used in the preparation of layer cakes.

It has long been recognized that the use of various forms of cake toppings, particularly toppings which contain pieces of nuts and fresh or canned fruit and the like, are highly desirable because of the taste and aesthetic improvements which they impart to the baked products. As a result, bakers continuously strive to find means of improving these toppings and the methods by which they can be applied to cakes. One of the most common methods of applying fruit toppings to cakes is in the form of a translucent paste, a form which is very similar to a fruit pie filling. It is prepared by heating a mixture of fruit pieces, water or fruit juices, sugar, flavoring and a thickening agent such as flour, tapioca or cornstarch. When this has thickened into a gelatinous mass it can be applied to the top of a prebaked cake.

It can be easily seen that the above process can be quite cumbersome and time-consuming. The baker is required to prepare the batter and bake the cake. He must prepare the topping mixture separately and wait until the cake has been completely baked. Since it is quite common for baked cakes to rise higher in the center than at the edges, it is often necessary to cut away a sufficient section of the cake to accommodate the topping mixture. It is only then that the topping can be added to the cake to obtain the finished product. When it is necessary to remove a portion of the cake to accommodate the topping, the baker is left with the "trimmings" which more often than not are unusable and must be discarded.

The problem can be simplified when the baker is working with an unleavened, yeast leavened, or other type of dough such as is used in the making of cookies, coffee cakes, certain types of tarts and other pastries. These doughs are quite thick since they have a comparatively low liquid content. In this case it is possible to place the topping mixture upon the dough prior to baking. The dough is thick enough to prevent the fruit, nuts, and other topping ingredients from sinking to the bottom of the product. However, this easy method of preparation has not been available to the baker of layer and other cakes which are made from chemically-leavened batters. These batters utilize substantially greater amounts of water or water-containing liquids such as milk. As a result, they are too fluid to support a topping in the manner of the doughs described above; the fruit, nuts and other topping ingredients sink to the bottom of the batter during baking.

Accordingly, it is the principal object of this invention to provide an improved cake topping composition and a method for preparing an improved cake topping composition which can be used on cake batters. It is another object of this invention to provide an improved cake topping which is simple of application and is appealing in taste and appearance. It is a further object of this invention to provide a topping for cakes which can include fruit and nut pieces and the like if desired, and which can be baked simultaneously with the cake batter without the topping ingredients sinking to the bottom of the batter during baking.

Other objects and advantageous features of this invention will be apparent from the following description and claims.

Briefly, the objects of this invention are acheived by incorporating into a mixture of ordinary topping ingredients, such as sugar, shortening and flavor, a small amount of a rapid-acting water-binding agent. This rapid-acting water-binding agent which is hereafter more fully described is selected from the group consisting of pregelatinized starch, carboxymethyl cellulose, and sodium alginate. The mixture of topping ingredients containing the rapid-acting water-binding agent is distributed in an appropriate fashion over the cake batter immediately prior to baking.

It is essential that the rapid-acting water-binding agent be used in its unhydrated state. The essentiality of this requirement is illustrated in the following manner: If a fruit glaze is prepared by mixing fruit pieces, fruit juices or water, sugar and flavoring, using a water-binding agent as described herein as the thickener, and baked simultaneously with a cake batter, the objects of this invention are *not* achieved. The water-binding agent is not in its unhydrated state, being hydrated by the water or fruit juice in the topping, and during the baking process the topping ingredients and fruit settle to the bottom of the batter. Thus, in order to achieve the advantages of this invention the rapid-acting water-binding agent must be employed initially in the topping in an unhydrated state and the topping itself must be substantially water-free to avoid subsequent hydration of the binder.

While applicant does not wish to be bound by any particular theory, he does believe that the reasons for the new and unexpected results which he obtains are as follows. The apparent reason for the settling of the topping ingredients is that these ingredients, particularly the sugars, are dissolved by the moisture at the surface of the batter and by that moisture which escapes from the batter during the baking process. Sugar solutions are formed which tend to aggregate in small pools on the surface of the batter. These pools tend to cause cracks in the surface of the batter as the batter rises during baking. Eventually these cracks form tunnels to the bottom of the batter. It is through these tunnels that the topping ingredients pass to the bottom of the batter.

In the cases where fruit and nut pieces are present in the topping, the sugar solution pools tend to form in the area of these pieces, since the batter is generally somewhat lower at these points. As the cracks and tunnels form, the fruit or nut pieces tend to submerge into the batter through them. Thus, the formation of these cracks and tunnels is the prime reason for the settling of the fruit and nuts as well as for the settling of the other topping ingredients.

The use of the rapid-acting water-binding agents of this invention in the toppings discussed above avoids the problem of the settling of the fruit, nuts, and other topping ingredients. These agents serve to prevent this in two ways: Primarily, since the agent absorbs moisture rapidly, the moisture which emits from the batter during baking is absorbed by the water-binding agent, thus preventing the formation of the pools described above which in turn eliminates the subsequent cracking and tunneling of the batter. Secondly, as the moisture is taken up by the water-binding agent, a viscous layer forms which serves to hold all topping ingredients including the fruit or nut pieces on top of the batter. As a result of the above, no settling of fruit, nuts, or other topping ingredients is experienced, and the batter proceeds to bake in the normal fashion. Upon completion the cake produced is substantially identical in texture and content to one baked without such a topping. The topping itself is clear and attractive, has a pleasant texture and flavor, and does not tend to discolor with aging. It is substantially similar to a topping which is prepared separately and applied to the cake after the cake has been fully baked.

A vast number of water-binding agents and gel-forming substances are commercially available today. However, when used in conventional topping compositions, many of these agents produce gels which tend to darken or otherwise discolor upon aging, particularly when in the presence of fruit or fruit juices. Of those which do not discolor, the majority would be acceptable in preparing glaze-type topping for application to pre-baked cakes. In dealing with the toppings of this invention, however, other conditions must be met. Of the abundance of gel-forming substances available and tried in the toppings of this invention, very few have been found to be capable of absorbing the moisture emitted from a cake batter at a rate sufficient to avoid the formation of surface cracks in the batter and thereby prevent the settling in the batter of the topping ingredients and fruit and nut pieces. Of those which can absorb moisture at such a rate, most had to be used in such large amounts that the resulting topping was unacceptable in flavor, texture, or both. Examples of water-binding agents which performed unsatisfactorily in one or more of these respects noted above are flour, locust bean gum, guar gum and citrus pectin.

The specific water-binding agents which have been found to be acceptable for use in this invention are selected from the group consisting of pre-gelatinized starch, carboxymethyl cellulose, and sodium alginate. The amount of these water-binding agents which must be used is the amount sufficient to absorb substantially all of the water which aggregates on top of the batter during baking. Since water is seldom if ever added to such a topping mixture, and since comparatively little moisture is emitted from fruit or nut pieces or other topping ingredients during baking, the optimum amount of the water-binding agent to be used will generally vary with the moisture content of the cake batter. For the standard cake mixes and the majority of the home recipe preparations, the acceptable amounts of agent for use in a topping for a standard one-layer cake, i.e., an 8-inch square or 9-inch round layer of cake, are as follows (given as percent by weight of a topping mixture of 2½ to 3½ ounces):

| Water-binding agent: | Amount in topping |
|---|---|
| Pre-gelatinized starch | About 1.5% to about 7%. |
| Carboxymethyl cellulose | About 0.35% to about 1.25%. |
| Sodium alginate | About 0.35% to about 1.25%. |

When smaller or larger cake layers are used, or for batters with unusually high or unusually low moisture content, the amount of the water-binding agent will vary accordingly. These water-binding agents, of course, can be used in combination if desired. The pre-gelatinized starch for use in this invention can be derived from any of the common sources, i.e., wheat, corn, potato, rice, arrowroot, barley, tapioca, sorghum starches, and the like.

The toppings of this invention can be used with any batter desired including freshly mixed batters prepared from scratch and batters prepared from pre-packaged mixes. The toppings of this invention may be successfully used on layer cakes, cupcakes, and other baked goods similarly prepared from batters.

There are no special mixing requirements for the preparation of the toppings of this invention. The topping ingredients may be mixed in any manner which achieves a reasonable interblending of the ingredients. When used in conjunction with fruit or nuts, the fruit or nut pieces may be mixed with the other topping ingredients, or may be placed on the batter before or after the addition of the other topping ingredients.

The toppings for use in the present invention are those composed generally of sugars, shortening, and the water-binding agents described above. For optimum flavor and texture, the sugars should be a mixture of sucrose and dextrose, with brown sugar added if desired. The shortening which is used may be any plastic or liquid shortening. If a plastic shortening is used, it should be one which is workable at room temperature, i.e., a shortening with an iodine value of 60 or above. Liquid shortening tends to leave the topping more transparent and with a more homogeneous texture than plastic shortening; therefore, in the preferred operation, liquid shortening is used in the toppings of this invention.

In addition to the above ingredients, flavorings such as vanilla, chocolate, butter, cinnamon, maple, fruit and nut flavorings can be added. Likewise, color and flavor improvers, the most common of which are maple and dark brown sugar syrups, and texture improvers, such as corn syrup solids, can be added if desired. The amounts of topping ingredients other than the water-binding agent are independent of the moisture content of the batter. In the toppings of this invention, the following components can be present in the amounts indicated, expressed in percent by weight of the topping:

Sucrose, from about 25% to about 40%.
Dextrose, from about 20% to about 55%.
Brown sugar, from about 0% to about 25%.
Shortening, from about 6% to about 13%.
Maple or dark brown sugar syrup, from about 0% to about 5%.
Corn syrup solids, from about 0% to about 5%.
Flavorings, from about 0% to about 0.25%.

The topping should be substantially moisture free; however, up to about 5 to about 10 percent by weight of moisture, depending upon the amount of water-binding agent used, can, be tolerated without losing the advantages described above.

The sugar ingredients which can be sucrose, dextrose and brown sugar and mixtures thereof must be present in a total minimum amount of about 70%, but not exceeding a total of about 95% by weight of the topping. The topping can also contain any other additives commonly used in cake toppings. For example, the preferred topping will contain nutmeats such as walnuts, pecans, or almonds, or particulate fruit such as apple, peach and pineapple slices, cherries, coconut, or any form of berries, or mixtures of any of the above.

The following examples are given to illustrate the use of this invention in preparing toppings which can be placed on cake batters and baked simultaneously therewith. They are not intended to be limitations upon the invention.

EXAMPLE 1

A 10½ ounce cake batter was prepared by hand mixing in a bowl one medium sized whole egg and one-half cup of water with the following ingredients, expressed in percent by weight:

| | |
|---|---:|
| Sucrose | 44.00 |
| Flour | 41.80 |
| Shortening | 10.50 |
| Dextrose | 1.00 |
| Salt | 0.90 |
| Baking soda | 0.55 |
| Sodium acid pyrophosphate | 0.80 |
| Artificial color | 0.05 |
| Flavor | 0.23 |
| Carboxymethyl cellulose | 0.17 |
| | 100.00 |

This batter was placed in an 8-inch square baking pan. Three ounces of topping mix was prepared by hand mixing in a bowl the following ingredients, expressed in percent by weight:

| | |
|---|---:|
| Dextrose | 43.97 |
| Sucrose | 38.00 |
| Liquid shortening | 12.00 |
| Dark brown sugar syrup | 3.00 |
| Corn syrup solids | 2.00 |
| Carboxymethyl cellulose | 1.00 |
| Flavoring | 0.03 |
| | 100.00 |

The topping mixture was sprinkled evenly over the cake batter and the cake baked at 350° F. for 25 minutes. The resulting cake was light and tender and showed no evidence of cracks at the top surface. The topping had been formed into a glaze-like substance on the top of the cake and had an appealing flavor, texture and appearance, and did not tend to discolor upon aging.

When in the above example sodium alginate is substituted for the carboxymethyl cellulose, substantially similar results are obtained.

EXAMPLE 2

A cake batter was prepared in the same manner and using the same ingredients described in Example 1. The batter was placed in an 8-inch square baking pan and 4½ ounces of peach slices were distributed evenly across the top of the batter. A 3¼ ounce topping mixture was prepared by blending the following ingredients in a bowl with a home style electric mixer at medium speed. The amount of the topping ingredients is expressed in percent by weight:

| | |
|---|---:|
| Dextrose | 51.50 |
| Sucrose | 32.20 |
| Liquid shortening | 9.00 |
| Dark brown sugar syrup | 4.00 |
| Pre-gelatinized cornstarch | 3.24 |
| Flavoring | 0.06 |
| | 100.00 |

The topping mixture was distributed evenly over the top of the fruit and batter. The cake was then baked at 350° F. for 25 minutes. The cake so prepared was light and flaky. The peach slices and other topping ingredients remained on top of the cake and the topping had a pleasant taste, texture, appearance, and did not tend to discolor upon aging. When the toppings are made as described in the above examples, all commonly used fruit pieces, such as those selected from the group consisting of cherries, peach slices, apple slices and pineapple slices, and nuts, such as those selected from the group consisting of pecans, almonds and walnuts, can be used and substantially similar results are obtained.

What is claimed is:
1. The method of preparing a baked cake and a topping thereon which comprises:
   (A) admixing in the absence of moisture topping ingredients comprising shortening, from about 70% to about 95% by weight sugars, and a rapid-acting water-binding agent selected from the group consisting of pregelatinized starch, carboxymethyl cellulose and sodium alginate to form a substantially water-free topping composition;
   (B) placing the topping composition on top of an unbaked cake batter; and
   (C) baking the cake batter and topping composition; the rapid-acting water-binding agent in step (A) being present in an unhydrated state and in an amount sufficient to absorb substantially all moisture which aggregates on top of the cake batter during baking.
2. The method of claim 1 wherein fruit pieces are added to the named topping ingredients.
3. The method of claim 1 wherein nut pieces are added to the named topping ingredients.
4. The method of claim 1 wherein the rapid-acting water-binding agent is pregelatinized starch.
5. The method of claim 2 wherein the shortening is liquid shortening.
6. The method of claim 1 wherein the topping ingredients comprise from about 6% to about 13% by weight shortening, from about 70% to about 95% by weight sugars and wherein the pregelatinized starch is used in an amount of from about 1.5% to about 7% by weight of the topping ingredients, the carboxymethyl cellulose is used in an amount of from about 0.35% to about 1.25% by weight of the topping ingredients, and the sodium alginate is used in an amount from about 0.35% to about 1.25% by weight of the topping ingredients.

References Cited

UNITED STATES PATENTS

| | | | |
|---|---|---|---|
| 2,221,563 | 11/1940 | Young | 99—139 |
| 2,442,658 | 6/1948 | Lloyd | 99—139 |
| 2,914,410 | 11/1959 | Butler | 99—139 |

OTHER REFERENCES

Given, Meta: Modern Encyclopedia of Cooking, vol. 1, J. G. Ferguson and Assoc., Chicago, 1949, p. 616.

A. LOUIS MONACELL, *Primary Examiner.*

J. M. HUNTER, *Assistant Examiner.*